(12) United States Patent
Ouyang

(10) Patent No.: US 7,929,276 B2
(45) Date of Patent: Apr. 19, 2011

(54) COVER ASSEMBLY AND PORTABLE ELECTRONIC DEVICE USING SAME

(75) Inventor: Zhi-Bin Ouyang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 72 days.

(21) Appl. No.: 12/478,028

(22) Filed: Jun. 4, 2009

(65) Prior Publication Data

US 2010/0172070 A1 Jul. 8, 2010

(30) Foreign Application Priority Data

Jan. 5, 2009 (CN) .......................... 2009 1 0300047

(51) Int. Cl.
*G06F 1/16* (2006.01)

(52) U.S. Cl. .................................. 361/679.01; 381/391

(58) Field of Classification Search ............. 361/679.01; 381/391; 439/367, 142
See application file for complete search history.

(56) References Cited

U.S. PATENT DOCUMENTS

| | | | |
|---|---|---|---|
| 7,458,682 B1* | 12/2008 | Lee ................................ | 351/158 |
| 7,473,112 B2* | 1/2009 | Zhu et al. ....................... | 439/142 |
| 7,500,866 B2* | 3/2009 | Gennai et al. ................. | 439/367 |
| 7,611,371 B2* | 11/2009 | Guo ................................. | 439/367 |
| 7,649,732 B2* | 1/2010 | Yang et al. ............... | 361/679.01 |
| 7,798,828 B2* | 9/2010 | Kuo ................................. | 439/142 |
| 2003/0008624 A1* | 1/2003 | Su ..................................... | 455/90 |
| 2010/0128419 A1* | 5/2010 | Ren .......................... | 361/679.01 |
| 2010/0128420 A1* | 5/2010 | Li et al. ................... | 361/679.01 |

* cited by examiner

*Primary Examiner* — Lisa Lea-Edmonds
(74) *Attorney, Agent, or Firm* — Steven M. Reiss

(57) ABSTRACT

A cover assembly is described. The cover assembly includes a body section defining a hole, a cover section for covering the hole, and an elastic member mounted to the cover section. The elastic member includes a latching arm. The interior wall of the hole defines a latching slot. The latching arm latches into the latching slot.

14 Claims, 4 Drawing Sheets

COVER ASSEMBLY AND PORTABLE ELECTRONIC DEVICE USING SAME

BACKGROUND

1. Technical Field

The present disclosure relates to cover assemblies and, particularly, to a cover assembly used in a portable electronic device.

2. Description of Related Art

Portable electronic devices (e.g., mobile phones) usually have earphone holes for insertion of earphones. Covers may be for covering and protect the earphone holes from e.g., water and dust.

A typical earphone cover is often made of rubber and is fixedly connected to the mobile phone by a flexible strip adjacent to the earphone hole. The covering/exposing of the earphone hole is achieved by bending the earphone cover towards/away from the earphone hole around the flexible strip.

However, the flexible strip may not sustain repeatedly use and can easily break.

Therefore, there is room for improvement within the art.

BRIEF DESCRIPTION OF THE DRAWINGS

Many aspects of the cover assembly can be better understood with reference to the following drawings. These drawings are not necessarily drawn to scale, the emphasis instead being placed upon clearly illustrating the principles of the present cover assembly. Moreover, in the drawings like reference numerals designate corresponding sections throughout the several views.

DETAILED DESCRIPTION

The present cover assembly is suitable for use in portable electronic devices e.g., mobile phones and personal digital assistant (PDA).

Figure 1:
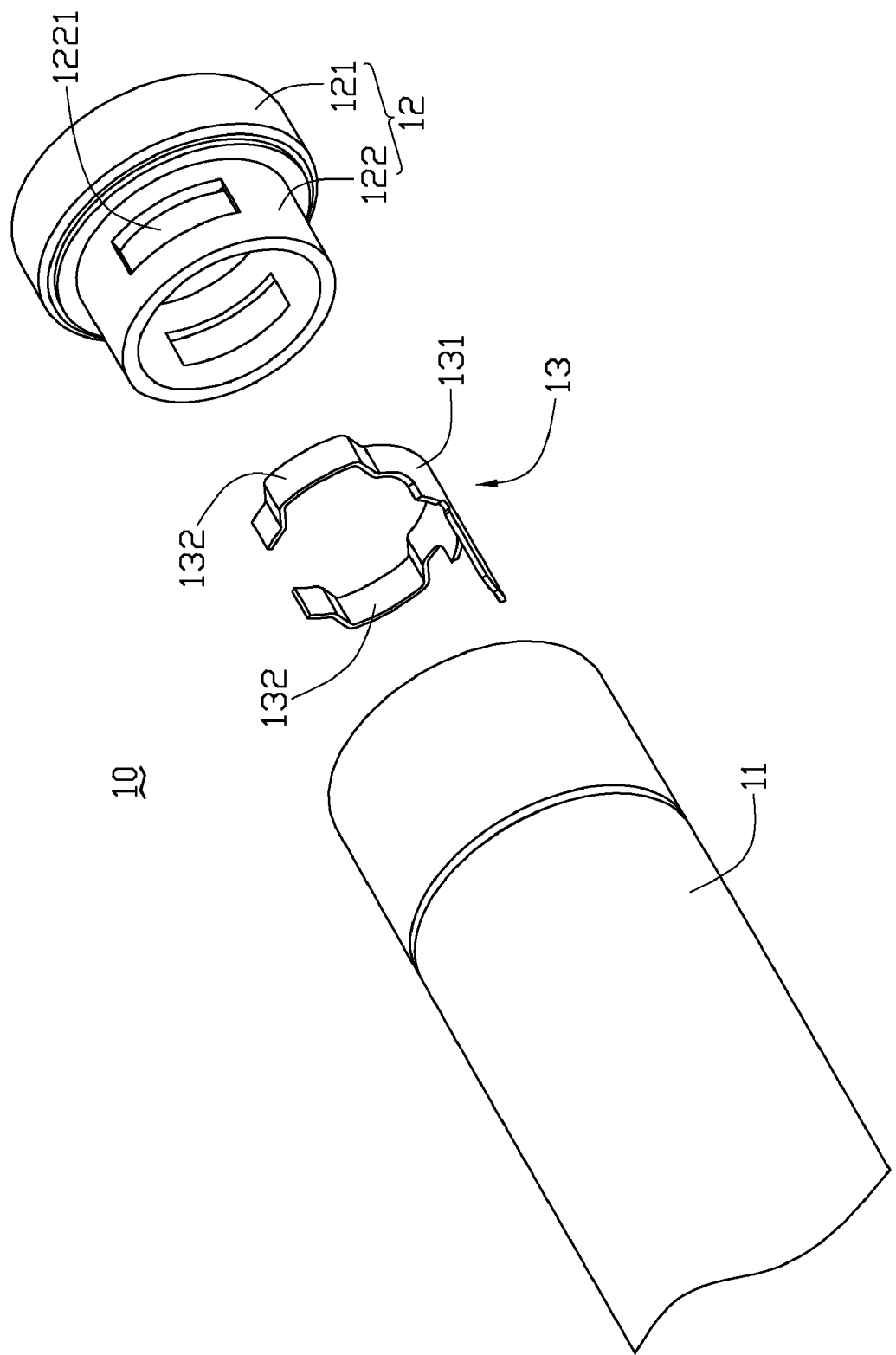
FIG. 1 is an isometric, exploded view of a cover assembly, in accordance with an exemplary embodiment.
Figure 2:
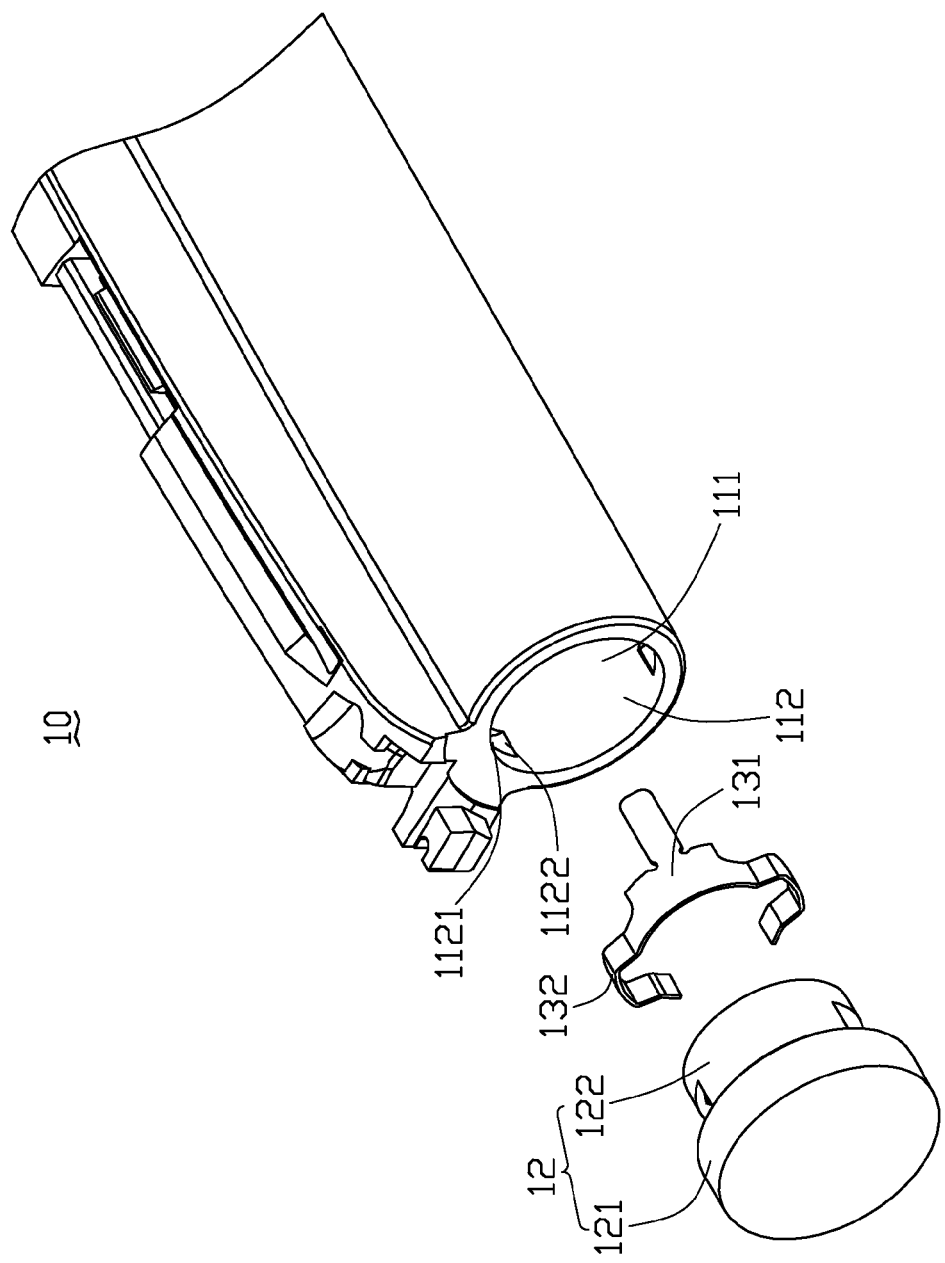
FIG. 2 is another isometric, exploded view of the cover assembly of FIG. 1.
Figure 3:
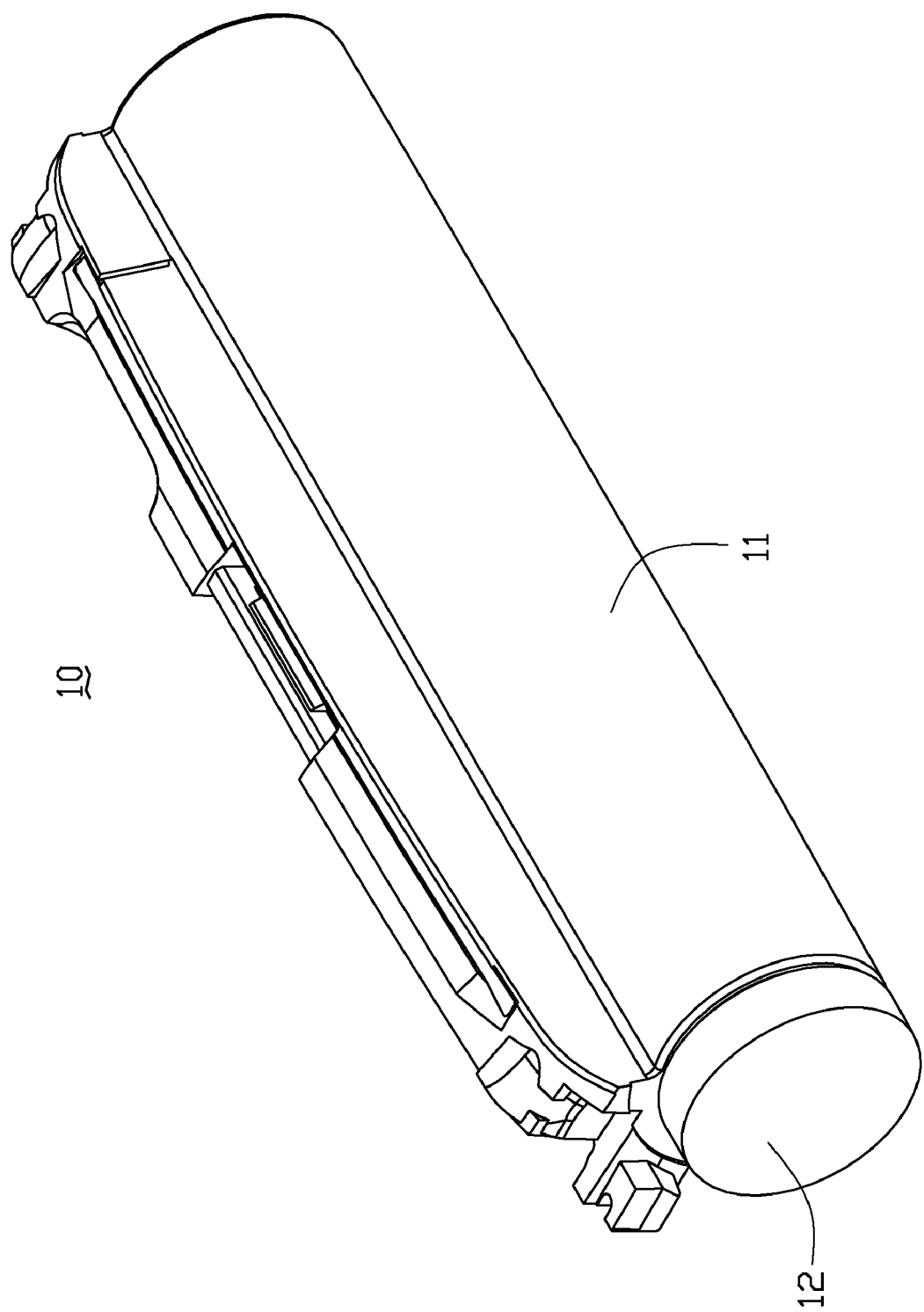
FIG. 3 is an assembled view of the cover assembly of FIG. 1.

FIGS. 1 through 3 show an exemplary cover assembly 10 including a body section 11, a cover section 12 and an elastic member 13. The cover section 12 is detachably mounted to the body section 11 by the elastic member 13.

In this embodiment, the body section 11 is a housing of a portable electronic device. The body section 11 defines a hole 111, forming an interior wall 112. The interior wall 112 defines two symmetric latching slots 1121. Each latching slot 1121 connects to the interior wall 112 by a guiding wall 1122. The guiding wall 1122 is arcuate, and used to guide the elastic member 13 to slide between the latching slot 1121 and the interior wall 112.

The cover section 12 includes a shielding portion 121 and a rotating portion 122 protruding from the shielding portion 121. The shielding portion 121 may be a round cover. The rotating portion 122 is a hollow cylinder and is received in the hole 111 and tightly attached to the interior wall 112. The rotating portion 122 defines two through cutouts 1221 corresponding to the latching slots 1121. The through cutout 1221 has the same size and figure as the latching slot 1121.

The elastic member 13 is generally arcuate, includes a base 131 and two latching arms 132. The two latching arms 132 are located at two ends of the base 131. The base 131 has an arcuate so that the base 131 can easily insert into the rotating portion 122 and firmly attaches to the interior surface of the rotating portion 122. When the two latching arms 132 are pressed towards each other, each latching arm 132 can generate an elastic force away from the other latching arm 132.

Figure 4:
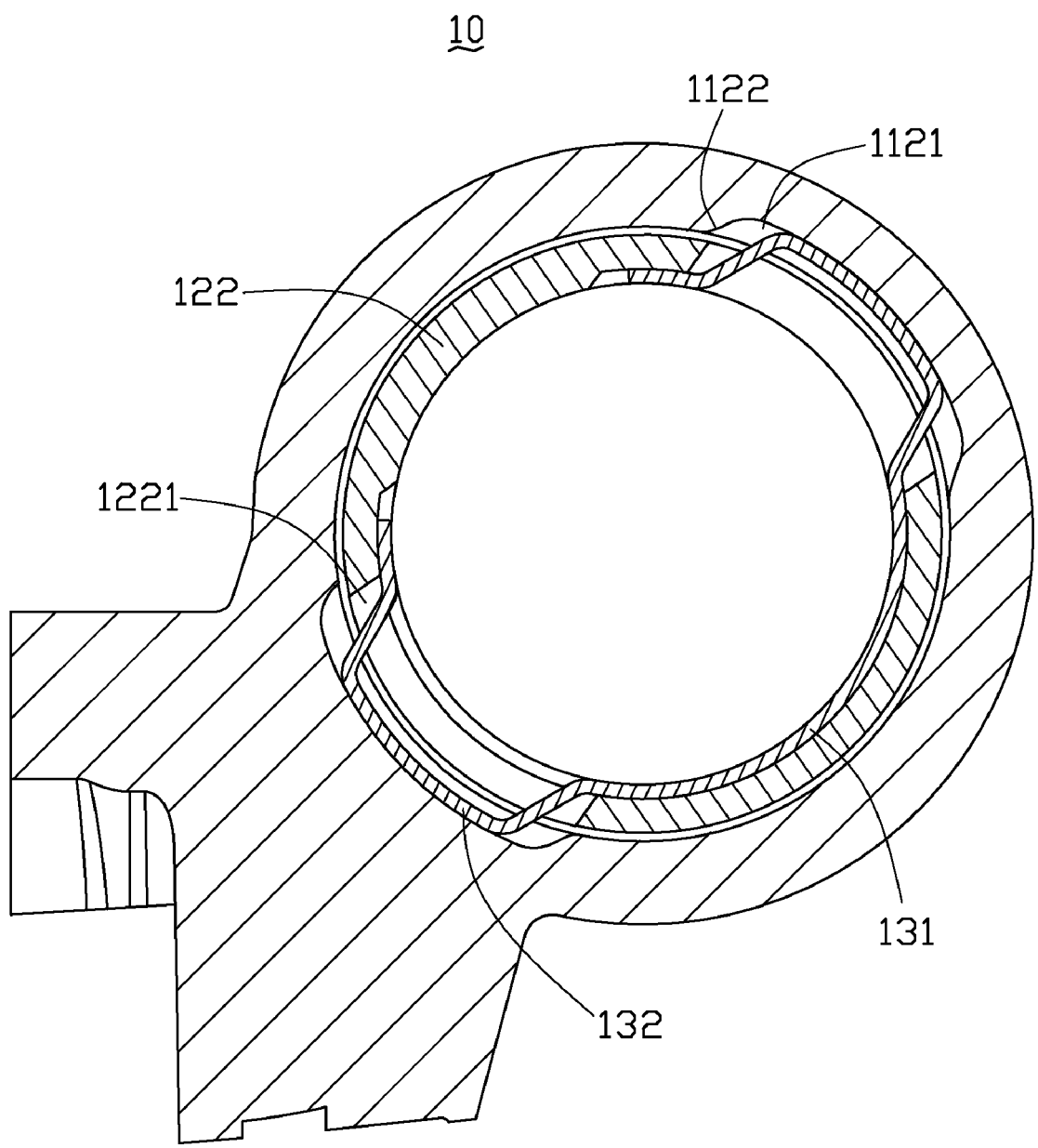
FIG. 4 is a sectional view of the cover assembly of FIG. 3 taken along the line V-V.

Referring to FIGS. 3 and 4, in assembly of the elastic member 13 to the cover section 12, the two latching arms 132 are pressed towards each other, at this time, the elastic member 13 can be inserted into the rotating portion 122 until the two elastic arms 132 are exposed through the two through cutouts 1221. Thus, the elastic member 13 is combined with the cover section 12 as a whole with the help of the elastic force of the latching arms 132.

Continuing referring to FIG. 4, to cover the hole 111, the rotating portion 122 is rotatably mounted in the hole 111, at this time, the two latching arms 132 are pressed by the interior wall 112 and force into the through cutouts 1221. Then, the cover section 12 and the elastic member 13 are together until the two through cutouts 1221 are aligned with the latching slots 1121. At this time, the two latching arms 132 deform and latch into the corresponding latching slots 1121. Thus, the shielding portion 121 of the cover section 11 stably covers the hole 111.

To gain access to the hole 111, the cover section 12 is rotated in a clockwise or counterclockwise direction, the two latching arms 132 are rotated together with the cover section 12 and slides into the interior wall 112 from the latching slots 1121 guided by the guiding walls 1122. Thus, the cover section 12 can be easily detached from the body section 11 to expose the hole 111.

The latching arms 132 latch into the latching slots 1121 to stably combine the cover section 12 to the body section 11, thus avoiding break of the flexible strip and prolonging the lifespan of the cover assembly 10.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A cover assembly, comprising:
    a body section defining a hole;
    a cover section for covering the hole, the cover section including a rotating portion received in the hole, the rotating portion being hollow, the rotating portion defining a through cutout;
    an elastic member mounted to the cover section, the elastic member including a latching arm received in the through cutout, the interior wall of the hole defining a latching slot, the latching arm latching into the latching slot.

2. The cover assembly as claimed in claim 1, wherein the elastic member includes a base, the latching arm connects to an end of the base, the base is received in the rotating portion and tightly attaches to the interior surface of the rotating portion.

3. The cover assembly as claimed in claim 1, wherein the latching slot connects to the interior wall by a guiding wall, the guiding wall is used to guide the elastic member to slide between the latching slot and the interior wall.

4. The cover assembly as claimed in claim 3, wherein the guiding wall is arcuate.

5. The cover assembly as claimed in claim 1, wherein the elastic arm further includes another latching arm, the interior wall of the hole defines another latching slot, the latching arm latches into the latching slot.

6. A portable electronic device, comprising:
   a housing defining a hole;
   a cover section for covering the hole, the cover section including a rotating portion received in the hole, the rotating portion defining a cutout;
   an elastic member mounted to the cover section, the elastic member including a latching arm, the latching arm received in the cutout and partially protruding from the rotating portion, the interior wall of the hole defining a latching slot, the latching arm latching into the latching slot.

7. The portable electronic device as claimed in claim 6, wherein the rotating portion is hollow, and the cutout is through.

8. The portable electronic device as claimed in claim 7, wherein the elastic member includes a base, the latching arm connects to an end of the base, the base is received in the rotating portion and tightly attaches to the interior surface of the rotating portion.

9. The portable electronic device as claimed in claim 6, wherein the latching slot connects to the interior wall by a guiding wall, the guiding wall is used to guide the elastic member to slide between the latching slot and the interior wall.

10. The portable electronic device as claimed in claim 9, wherein the guiding wall is arcuate.

11. The portable electronic device as claimed in claim 6, wherein the elastic arm further includes another latching arm, the interior wall of the hole defines another latching slot, the latching arm latches into the latching slot.

12. A cover assembly, comprising:
    a body section defining a hole;
    a cover section for covering the hole, the cover section including a rotating portion received in the hole, the rotating portion defining a cutout;
    an elastic latching arm received in the through cutout and partially protruding from the rotating portion, the interior wall of the hole defining a latching slot, the latching arm latching into the latching slot.

13. The portable electronic device as claimed in claim 12, wherein the latching slot connects to the interior wall by a guiding wall, the guiding wall is used to guide the elastic member to slide between the latching slot and the interior wall.

14. The portable electronic device as claimed in claim 13, wherein the guiding wall is arcuate.

* * * * *